June 16, 1964  J. R. NASH ETAL  3,137,094
PETROLEUM FLAME CROP THINNER
Filed July 20, 1962  4 Sheets-Sheet 1
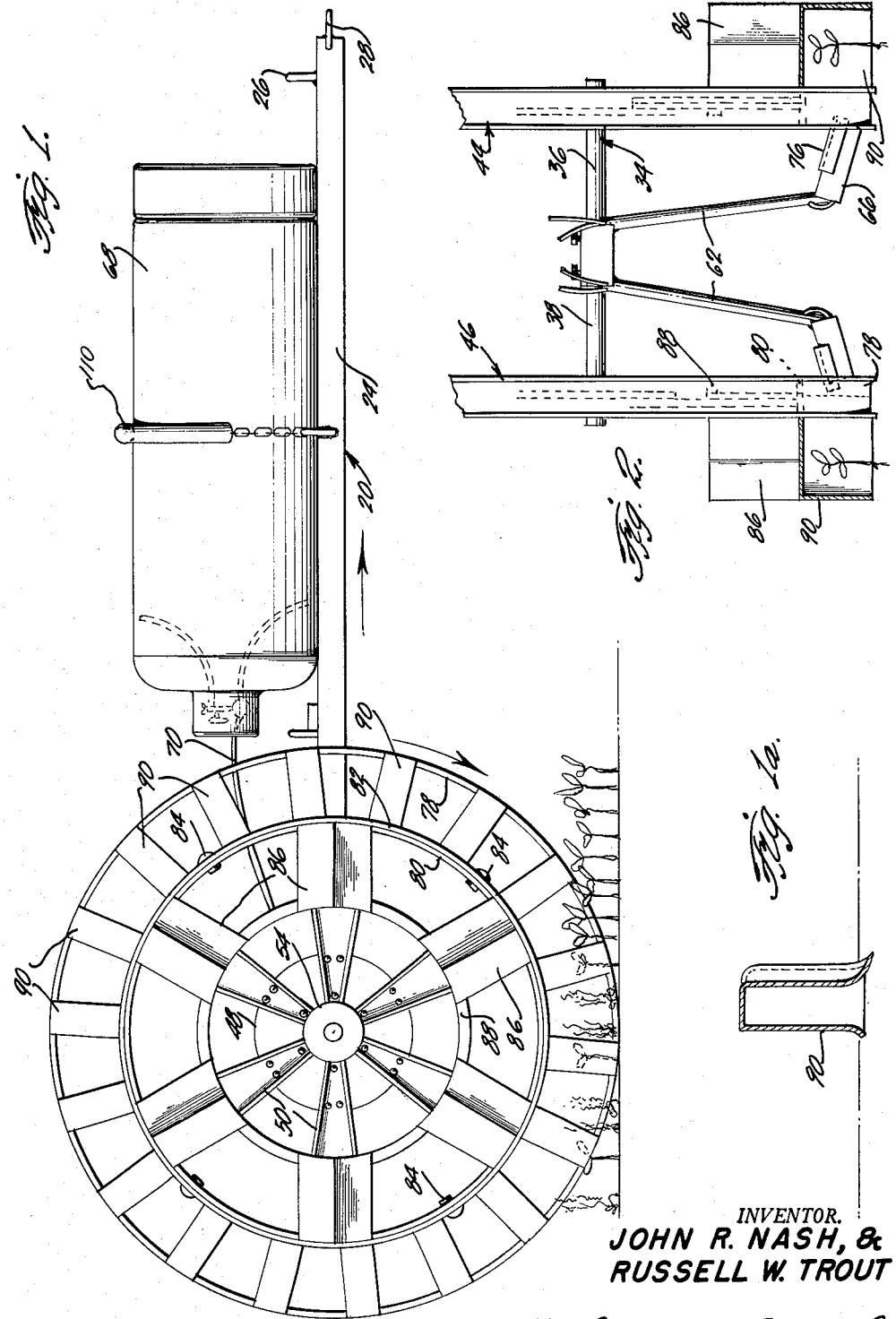
INVENTOR.
JOHN R. NASH, &
RUSSELL W. TROUT
BY June 16, 1964
J. R. NASH ETAL
3,137,094
PETROLEUM FLAME CROP THINNER
Filed July 20, 1962
4 Sheets-Sheet 2
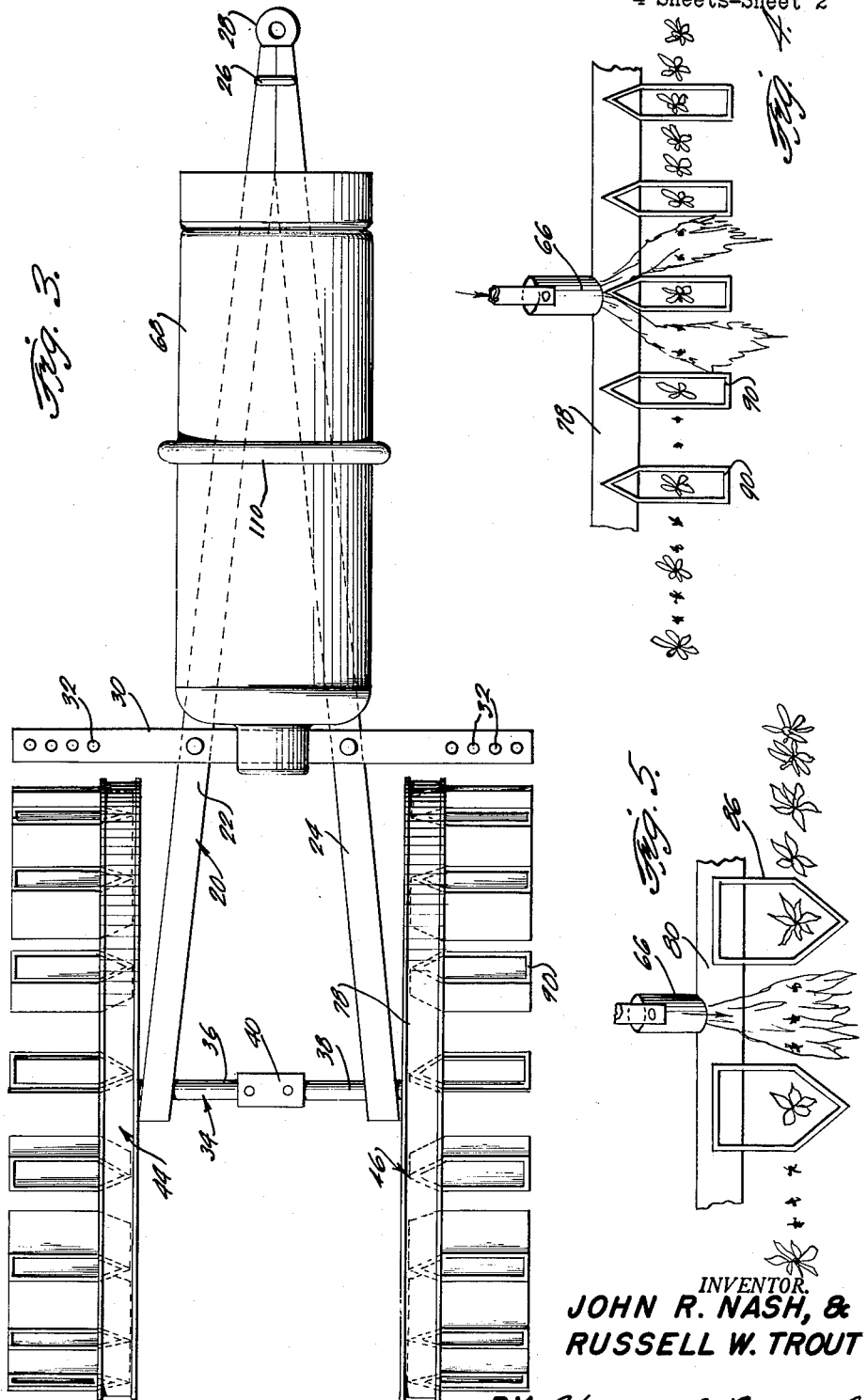
INVENTOR.
JOHN R. NASH, &
RUSSELL W. TROUT
BY *Victor J. Evans & Co.*
Attorneys

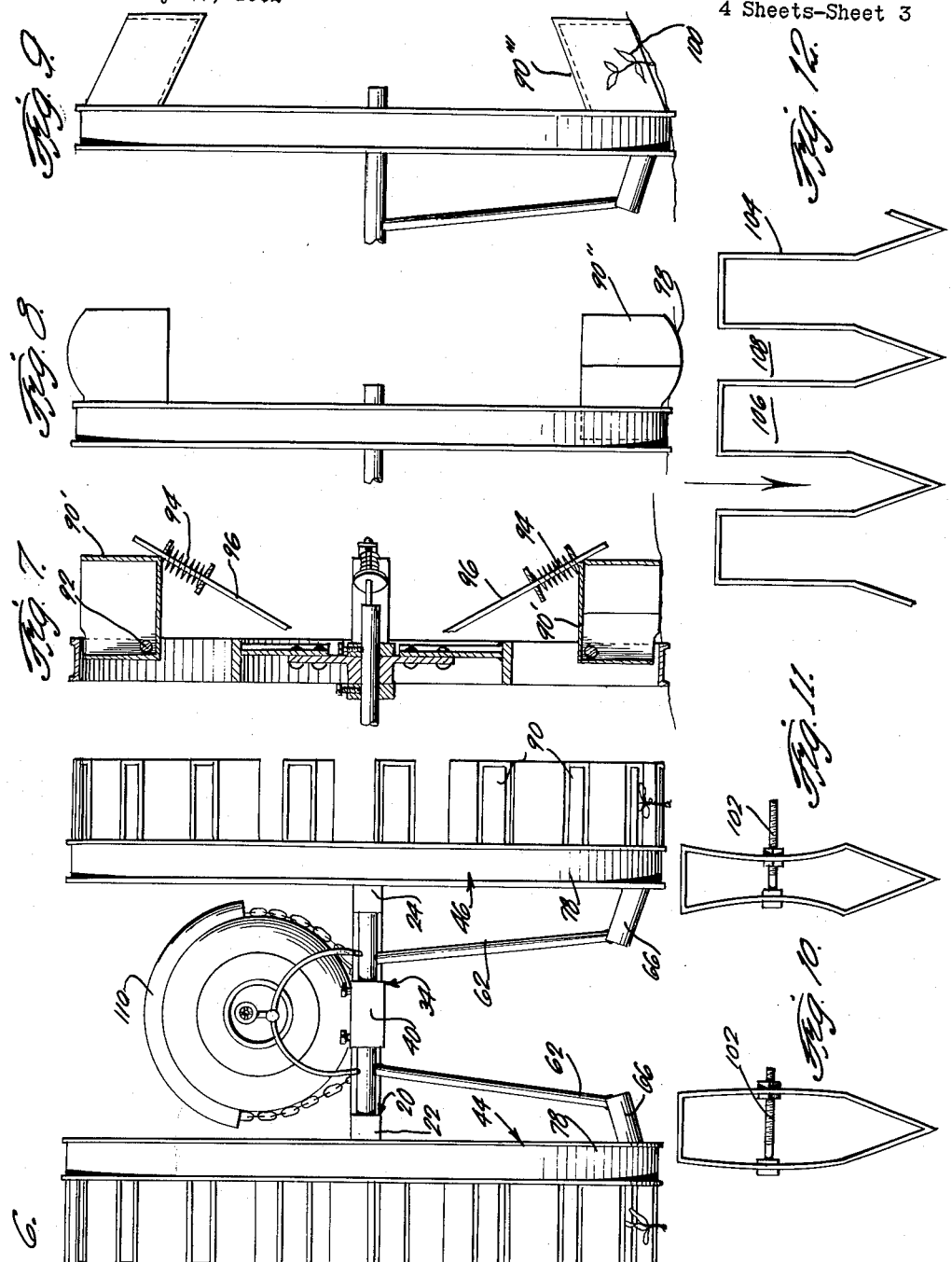

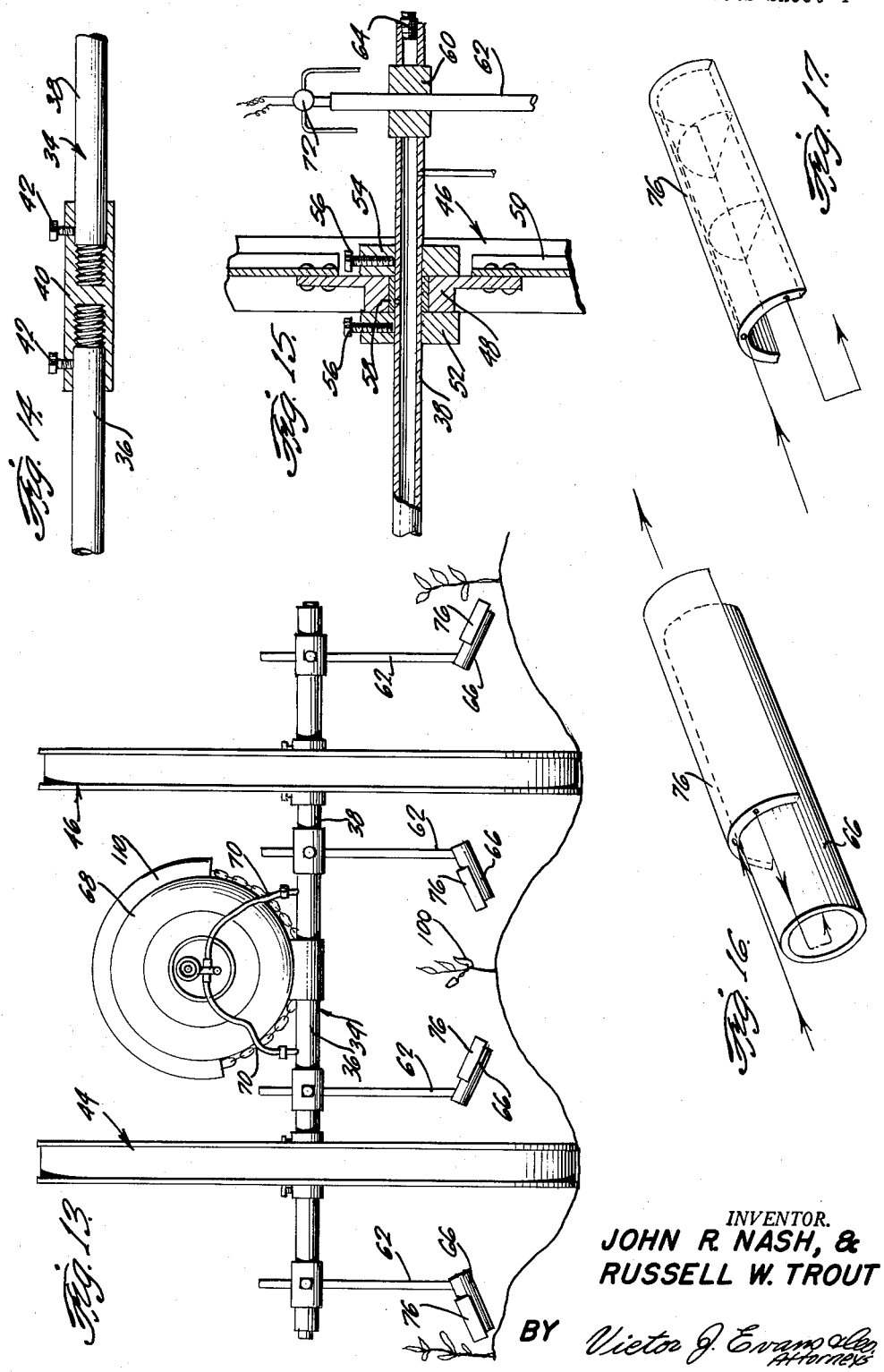

United States Patent Office 3,137,094
Patented June 16, 1964

1

3,137,094
PETROLEUM FLAME CROP THINNER
John R. Nash, 514 6th Ave., and Russell W. Trout,
Box 1213, both of Yuma, Ariz.
Filed July 20, 1962, Ser. No. 211,451
1 Claim. (Cl. 47—1)

The present invention relates to agricultural implements generally and in particular to a crop thinner using a petroleum product such as propane gas or the like for burning unwanted crop plants.

An object of the present invention is to provide a crop thinner mechanism for attachment to a towing vehicle which has means for selectively exposing certain plants in the ground to a flame and means for protecting other plants in the ground so as to thin the plants in a row to a desired thinness.

Another object of the present invention is to provide a crop thinner which is highly effective in action, one having means for shutting off the flow of gas to the burners associated with one wheel while leaving the burners associated with another wheel supplied with gas, one which is economical to manufacture in quantity at reasonable cost, one sturdy in construction and having long life characteristics, and one which lowers the cost of production of a given agriculture product such as cotton or the like.

These and other objects and advantages of the present invention will be fully apparent from the following description when taken in connection with the annexed drawings, in which:

FIGURE 1 is a side elevational view of the crop thinner according to the present invention, FIGURE 1a is a view in section of one of the guards employed in the assembly of FIGURE 1, FIGURE 2 is a fragmentary elevational view partially in section of the rearward end portion of the assembly shown in FIGURE 1, FIGURE 3 is a top plan view, FIGURE 4 is a diagrammatic view of the guards of one of the rims, FIGURE 5 is a diagrammatic view of the guards of FIGURE 4 in a reversed position, FIGURE 6 is an elevational view of the thinner as seen from the rear, FIGURE 7 is a view in section showing a modified form of the thinner, FIGURE 8 is an elevational view showing a still further modified form of the thinner, FIGURE 9 is a view in elevation showing a still further modification, FIGURE 10 is a top plan view of one of the guards showing a modified form thereof, FIGURE 11 shows the guard of FIGURE 10 changed in configuration, FIGURE 12 is a diagrammatic view of another form of the guards according to the present invention, FIGURE 13 is a rear elevational view of a modified form of the thinner, showing the guards removed, FIGURE 14 is a view partially in section wth portions broken away showing an adjustable axle connection, FIGURE 15 is a view partially in section showing the wheel and axle connection according to a modification, FIGURE 16 is a perspective view of a burner with the arrows indicating the gas flow, and FIGURE 17 is a perspective view of the liquid fuel vaporizer portion of the burner assembly shown in FIGURE 16.

Referring in greater detail to the drawings in which like numerals indicate like parts throughout the several views, in FIGURES 1 to 6, inclusive, it will be seen that the present invention provides a mobile frame 20 including longitudinally extending diverging tongue members 22 and 24. Hitch rings 26 and 28 are provided on the converged ends of the tongue members 22 and 24 and are adapted for attachment to either a pushing or a towing vehicle.

A cross bar 30 extends transversely across the frame 20 intermediate the ends of the members 22 and 24 and is provided at each end with a plurality of holes 32 for attachment thereto of a work implement.

A fixed axle 34 is secured to the diverged ends of the tongue members 22 and 24 and the axle is in two parts 36 and 38 having a threaded connector 40 adjustable securing the parts 36 and 38 together. This structure is shown most clearly in FIGURE 14.

The axle parts 36 and 38 may be threaded into the connector 40 as far as desired and set screws 42 are employed to secure the parts 36 and 38 in their adjusted position relative to each other. This provides inward or outward spacing for the wheels 44 and 46 which are freely rotatable upon the axle parts 36 and 38, respectively.

As shown in FIGURE 15, the wheel 46 for example is mounted upon a hub 48 to which is fixed the radially arranged spokes 50 fabricated of angle iron. On each side of the hub 48 are collars 52 and 54 held in place by set screws 56.

A sleeve bearing 58 supports the hub 48 on the shaft part 38. The other wheel 44 is similarly mounted upon the other shaft part 36.

In FIGURE 15 there is shown a block 60 supported upon the axle part 38, the block 60 forming a support for a burner supply tube 62 which is vertically adjustable in the block 60, as shown in FIG. 15, and may be clamped therein by suitable clamp bolts in the blocks 60, as shown in FIG. 13. The axle part 38 is hollow and closed at the adjacent end by a plug 64. A gas connection is made between the hollow axle part 38 and the tube 62 and a burner 66 is carried on the lower end of the tube 62. A tank 68 is mounted upon the tongue members 22 and 24 inwardly of the hitch rings 26 and 28 and conduits 70 connect the interior of the tank 68 with the interior of the axle parts 36 and 38 as shown in FIGURE 13.

A feature of the invention resides in the provision of a solenoid valve 72 connected in communication with each of the tubes 62 and controlling the flow of gas either into the tube 62 or out of the tube 62. The electrical switches controlling the solenoid 72 are preferably in a position accessible to the operator of the vehicle which tows or pushes the weeder of the invention.

In FIGURES 16 and 17 are shown the burner 66, the arrows indicating the flow of liquid fuel and gaseous fuel therethrough. A heat exchange or fuel vaporizer 76, of semi-cylindrical formation, is mounted upon one end portion of the burner 66 and projects over the flame end of the burner 66. In FIGURE 17 the vaporizer 76 is shown removed from the burner 66.

Referring again to FIGURES 1 and 2, it will be seen that the wheels 44 and 46 each have an outer rim 78 and an inner rim 80. The wheels 44 and 46 being identical except for lefts and rights, they will be described with reference to the wheel 46.

A second ring 82 is spaced inwardly from the outer rim 78 and is secured by bolt and nut assemblies 84 to the rim 80. A plurality of evenly spaced guards 86 extend between another ring 88 and the rim 80, between the ring 82 and the outer rim 78 are other spaced guards 90, the guards 86 and the guards 90 forming spokes for the rims 80 and 78, respectively.

In FIGURE 1a, one of the guards 90 is shown with a partially flared skirt at the lower end thereof which gathers in the plant into the protection of the guard and also gives better traction to the petroleum thinner on soft soil.

In use, the rim 80 may be detached from the ring 82 by removal of the nut and bolt assemblies 84 and the guards 86 may be used as in FIGURE 5 to shield certain plants while other plants are burned by flames emitted from the burner 66. Upon replacement of the ring 82 on the rim 80 and replacement of the nut and bolt assemblies 84, the guards 90 may be employed, as in FIGURE 5, to shield other plants and to permit the flames emitted from the burner 66 to burn away intermediate plants.

The guards 90 of the outer rim 78 have their apices directed inwardly of the machine so as to divide the flame as in FIGURE 4. In FIGURE 5 the guards 86 of the rim 80 have their points away from the inner face of the machine and away from the burner 66.

In FIGURE 7 the guards 90′ are shown mounted on pivot points 92 and springs 94 on rods 96 bias the guards 90′ outwardly into contact with the soil.

In the modification shown in FIGURE 8, the guards 90″ have their lower ends arcuately curved, as at 98, for better penetration of the soil surrounding the plants.

In the modification shown in FIGURE 9 the guards 90‴ are shown fabricated so as to accommodate themselves to the slope of a hill on which plants are growing as at 100.

Another modification is shown in FIGURES 10 and 11 in which there is a bolt 102 provided for changing the shape of either the guard 90 or the guard 86, the bolt 102 being used to expand the guard as in FIGURE 10 or to collapse the side walls as in FIGURE 11.

In FIGURE 12 a guard is shown, as at 104, fabricated of a continuous material so as to have alternatingly guard pockets 106 and exposed pockets 108 into which the flame, as indicated by the arrow, may enter to kill the plants not protected by the guard pockets 106.

In use, either the inner ring of guards 86 may be employed or the guards 90 may be employed in any of their modifications by simply removing the outer ring of guards from the inner ring and lowering the frame 20 toward the ground the distance of the height of the guards 90.

The tank 68 is secured to the tongue members 22 and 24 by means of a chain and tube combination, as at 110 in FIGURE 3.

While the spacing between the guards 86 and the spacing between the guards 90 are different, no limitation is to be made upon the spacing of such guards with respect to each other. Further, if desired, the plant thinner of the present invention may be operated as in FIGURE 13 with the guards removed, and with the burner 66 directed toward the plant 100 toward the base thereof in order to defoliate the lower leaves from the plant crop.

Other changes and modifications may be made in the invention without departing from the spirit thereof as set forth in the appended claim.

What is claimed is:

A plant thinning apparatus comprising in combination:
(a) a mobile frame,
(b) a wheel supporting said frame,
(c) a hub in said wheel,
(d) a ring spaced radially outwardly from said hub and connected thereto,
(e) an inner rim spaced radially outwardly of said ring and in a common vertical plane therewith,
(f) a plurality of circumferentially spaced guards mounted to interconnect said ring and said inner rim, each adapted to enclose a plant in a row of plants upon rolling movement of said inner rim along and over said row and to leave unprotected therebetween other plants,
(g) a second ring demountably connectable to said inner rim,
(h) an outer rim lying radially outwardly of said inner rim and said second ring,
(i) a plurality of additional circumferentially spaced guards interconnecting said second ring and said outer rim, each of said additional guards being adapted to enclose a plant in a row of plants upon rolling movement of said outer rim along and over said row and to leave unprotected therebetween other plants,
(j) and a vertically adjustable burner carried by said frame and located so as to direct a flame toward whichever one of said inner and outer rims is in rolling contact with the ground.

References Cited in the file of this patent

UNITED STATES PATENTS

| | | |
|---|---|---|
| 753,926 | Smith | Mar. 8, 1904 |
| 2,456,901 | Swafford | Dec. 21, 1948 |
| 2,460,451 | Farrell | Feb. 1, 1949 |
| 2,487,353 | McLemore | Nov. 8, 1949 |
| 2,494,720 | Richards | Jan. 17, 1950 |
| 2,557,303 | McLemore et al. | June 19, 1951 |
| 2,569,194 | Poole et al. | Sept. 25, 1951 |
| 2,569,320 | Lea | Sept. 25, 1951 |
| 2,904,032 | Stanton | Sept. 15, 1959 |

FOREIGN PATENTS

| | | |
|---|---|---|
| 81,661 | Norway | Dec. 14, 1953 |
| 529,998 | Great Britain | Dec. 3, 1940 |